United States Patent
Goel et al.

(10) Patent No.: US 9,923,888 B2
(45) Date of Patent: Mar. 20, 2018

(54) SINGLE SIGN-ON METHOD FOR APPLIANCE SECURE SHELL

(71) Applicant: Veritas Technologies LLC, Mountain View, CA (US)

(72) Inventors: Vikas Goel, Sunnyvale, CA (US); Robert Koeten, Menlo Park, CA (US)

(73) Assignee: Veritas Technologies LLC, Mountain View, CA (US)

( * ) Notice: Subject to any disclaimer, the term of this patent is extended or adjusted under 35 U.S.C. 154(b) by 38 days.

(21) Appl. No.: 14/874,173

(22) Filed: Oct. 2, 2015

(65) Prior Publication Data

US 2017/0099280 A1      Apr. 6, 2017

(51) Int. Cl.
- *H04L 29/06* (2006.01)
- *H04L 29/08* (2006.01)
- *G06F 21/33* (2013.01)

(52) U.S. Cl.
CPC .......... *H04L 63/083* (2013.01); *G06F 21/335* (2013.01); *H04L 63/0807* (2013.01); *H04L 63/0815* (2013.01); *H04L 63/102* (2013.01); *H04L 63/168* (2013.01); *H04L 67/02* (2013.01);

(Continued)

(58) Field of Classification Search
CPC .................. H04L 63/0815; H04L 63/102; H04L 63/0807

See application file for complete search history.

(56) References Cited

U.S. PATENT DOCUMENTS

| | | | | |
|---|---|---|---|---|
| 8,474,017 B2* | 6/2013 | Schultz | ................ | G06F 21/41 726/4 |
| 8,615,794 B1* | 12/2013 | Tomilson | ............ | G06F 21/6218 713/182 |
| 9,191,394 B2* | 11/2015 | Novak | ................ | H04L 63/0884 |

(Continued)

FOREIGN PATENT DOCUMENTS

| | | |
|---|---|---|
| WO | 2007000493 A1 | 1/2007 |
| WO | 2001059628 A1 | 5/2007 |

OTHER PUBLICATIONS

Setting up a Linux system to do single-sign-on with Active Directory; James Y. Knight; Mar. 2010; https://fuhm.net/linux-and-active-directory/; Accessed on Jan. 3, 2017.*

(Continued)

*Primary Examiner* — James R Turchen
(74) *Attorney, Agent, or Firm* — Rory D. Rankin; Meyertons, Hood, Kivlin, Kowert & Goetzel, P.C.

(57) ABSTRACT

A system and method for efficiently establishing a secure shell connection for accessing Web resources. A user attempts to establish a secure Hypertext Transfer Protocol (HTTP) session between a client computing device and a remote storage device. The storage device redirects the Web browser of the client computing device to a single sign-on (SSO) third-party identity provider for authorizing the user. After successful authorization, the client computing device receives information to use to maintain a secure HTTP session. This information is stored on the storage device. The user attempts to establish a text-based secure shell session. The user is not prompted for login credentials. However, the user is authenticated using the previously stored information and a text-based secure shell session is established.

20 Claims, 5 Drawing Sheets

(52) U.S. Cl.
CPC .......... *H04L 67/025* (2013.01); *H04L 67/141* (2013.01); *H04L 67/20* (2013.01)

(56) References Cited

U.S. PATENT DOCUMENTS

| | | | | |
|---|---|---|---|---|
| 9,197,623 | B2* | 11/2015 | Srinivasan | H04L 63/08 |
| 2012/0008786 | A1* | 1/2012 | Cronk | H04L 63/102 |
| | | | | 380/282 |
| 2012/0011578 | A1* | 1/2012 | Hinton | H04L 9/3228 |
| | | | | 726/8 |
| 2013/0007845 | A1* | 1/2013 | Chang | G06F 21/62 |
| | | | | 726/4 |
| 2014/0068732 | A1* | 3/2014 | Hinton | G06F 21/41 |
| | | | | 726/6 |
| 2014/0337914 | A1* | 11/2014 | Canning | H04L 63/10 |
| | | | | 726/1 |
| 2015/0089623 | A1* | 3/2015 | Sondhi | H04L 63/08 |
| | | | | 726/9 |
| 2016/0094539 | A1* | 3/2016 | Suresh | H04L 67/025 |
| | | | | 726/7 |
| 2016/0142914 | A1* | 5/2016 | He | H04L 67/34 |
| | | | | 726/12 |

OTHER PUBLICATIONS

Goel, Vikas, U.S. Appl. No. 14/754,361, entitled "System and Method for Authentication in a Computing System", filed Jun. 29, 2015, 34 pages.

Goel, Vikas, U.S. Appl. No. 14/747,440, entitled "System and Method for Centralized Configuration and Authentication", filed Jun. 23, 2015, 39 pages.

International Search Report and Written Opinion in International Application No. PCT/US2016/055084, dated Dec. 13, 2016, 13 pages.

Kaminsky et al., "REX: Secure, Extensible Remote Execution", Proceedings of the General Track: 2004 USENIX Annual Technical Conference, Jul. 2, 2004, pp. 199-212.

* cited by examiner

SINGLE SIGN-ON METHOD FOR APPLIANCE SECURE SHELL

BACKGROUND OF THE INVENTION

Field of the Invention

This invention relates to the field of secure network communication and, more particularly, to efficiently establishing a secure shell connection for accessing Web resources.

Description of the Related Art

Early client-server computing models utilized code on each of the multiple client computing devices and on a remote server for a supported client-server application. The code for the client computing devices provided a user interface and the code was installed on each of the multiple client computing devices. Upgrades caused changes to the code on each of the multiple client computing devices. Additionally, the code for the client computing devices and the server typically was dependent on a given instruction set architecture (ISA) and operating system (OS).

Web-based applications handled many of the above issues by utilizing Web pages created by standard language formats. A Web browser on the client computing device transmits requests to a remote Web server storing the requested Web page. The Web browsers use the Hypertext Transfer Protocol (HTTP) to transfer the requests. The client code for an application hosted on the remote Web server is downloaded to the client computing devices when the particular Web page is successfully accessed.

The remote Web server hosting the application may restrict access to the application to a particular group of users. Early security practices for client-server computing models used the HTTP Basic Authentication, wherein a user provided credentials to be used to authenticate the user prior to allowing the user to access the hosted application. This type of authentication prompts the user for credentials for each access of other resources available through the remote Web server although the user was already authenticated. Additionally, once a user is authenticated, an application programming interface (API) key, which may include the credentials in an encoded format, is used in the header of each request. A malicious user gaining access to the computing device used by the authenticated user may reverse engineer the client code for the application on the computing device and obtain the stored API key.

Token authentication provides tracking of each connected computing device that accesses the Web-based application hosted on the remote Web server and does not prompt for credentials for accesses of other resources available through the remote Web server when the user was already authenticated. Operating systems provide additional security by hiding the storage of access tokens. In addition, access tokens have expiration periods which limits potential damage should a malicious user obtain the access token. Authentication services are used to verify the user credentials and generate the temporary access token to be used during a session on the remote Web server.

The generation and maintenance of token authentication is complex. Developers prefer to spend time creating the Web-based applications and getting the applications online and running quickly, rather than consuming an appreciable amount of time on writing code for supporting and maintaining the token authentication. Further, for many types of tasks and the corresponding Web-based applications, particular users, such as system administrators, prefer to use a secure shell (SSH) user interface. The SSH user interface provides a command-line interface (CLI) to the OS and the Web-based application. However, the SSH access typically prompts the user for another login attempt despite the system administrator already establishing a HTTP session on the remote Web server hosting the Web-based application. The authentication service may also use HTTP redirection while verifying the credentials. The SSH user interface is unable to support the HTTP redirection.

In view of the above, improved systems and methods for efficiently establishing a secure shell connection for accessing Web resources are desired.

SUMMARY OF THE INVENTION

Systems and methods for efficiently establishing a secure shell connection for accessing Web resources are contemplated. In various embodiments, a storage service device is deployed among multiple devices in a business environment, such as a relatively small business environment or alternatively a large enterprise environment. The storage service device may also be referred to as a storage device. Multiple client computing devices may be remotely connected to the storage device over a network, such as the Internet or a cloud-based network. The environment may include a third-party authentication service, which is also referred to as an identity provider, for handling user management such as authenticating users for web resources on the remote storage device with the restricted access.

The third-party identity provider (IDP) uses one or more Hypertext Transfer Protocol (HTTP) redirections while performing steps to authenticate the user. The HTTP redirections are supported by the user's web browser on the client computing device and by the web services on the storage device. However, the HTTP redirections are not supported by the secure shell (SSH) code (process) used for establishing a secure shell connection between a client computing device and the remote storage device.

After successful authorization is achieved with the SSO identity provider, the storage device may send an access token and an optional refresh token to the client computing device. Additionally, the storage device may send a client device identifier (ID) including one or more of a session cookie, an Internet Protocol (IP) address, and a media access control (MAC) address. The storage device may store the access token and/or the optional refresh token as well as the client device ID. At least the stored access token and the stored client device ID may be used later to authenticate the user without using the third-party identity provider when the user requests a text-based secure shell session. At least the stored access token may be used to authenticate access requests from the client device for web resources on the storage device. At this point, a secure HTTP session is established for the user between the client computing device and the remote storage device. The user may send requests using the secure HTTP session, wherein the requests include at least the access token and/or the optional refresh token and the client device ID.

At a later time, the user may request a web application on the storage device to establish a text-based secure shell (SSH) connection between the client computing device and the storage device. In various embodiments, the request includes a username, the access token and/or the optional refresh token, and the client device ID. When sending the request to the web application on the remote storage device for the text-based secure shell (SSH) session, the user is not prompted for login credentials. In addition, during the steps of authenticating the user for the text-based SSH session, the user is not prompted for login credentials.

The remote storage device receives the request for the text-based SSH session and locally authenticates the user without use of the third-party identity provider. Rather, the remote storage device may use the previously stored access token, and/or refresh token, and the client device ID along with the username. An identity and access manager (IAM) may be used by the remote storage device to authenticate the user. No HTTP redirections are used to perform the authentication. In some embodiments, an access token and an optional refresh token pair separate from the token(s) generated for the secure HTTP session are created for the text-based secure shell session. In other embodiments, the same access token and an optional refresh token pair used for the secure HTTP session is used for the text-based secure shell session. The remote storage device sends notification of the user being authenticated for the SSH session to the client computing device. The user is able to use a text-based secure shell connection between the client computing device and the remote storage device without a login step requesting credentials although a third-party identity provider is used in the system. The user may be presented with a command line interface (CLI) within the web browser on the client computing device.

These and other embodiments will be appreciated upon reference to the following description and accompanying drawings.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, signals, computer program instruction, and techniques have not been shown in detail to avoid obscuring the present invention.

Storage service devices (which may also be referred to as storage devices) may be deployed in any of a variety of business or other environments. In some embodiments, a storage device is a remote Web-based backup server. In other embodiments, the storage device may be a purpose-built backup appliance (PBBA) or storage appliance. In such environments, multiple client computing devices (client devices) may be remotely connected to the storage device over a network, such as the Internet or a cloud-based network. Examples of such client computing device include a desktop computer, a laptop, a tablet computer, a smartphone, and so forth.

For one or more users working on the client devices, the storage device may provide restricted access to resources hosted on the storage device. In some embodiments, the environment may include a third-party authentication service, which is also referred to as an identity provider, for handling user management such as the restricted access. The third-party identity provider (IDP) may use a single sign-on (SSO) service. With a SSO service, the user provides credentials only once, regardless of the number of separate applications accessed after the initial login. In addition to the above, the third-party identity provider (IDP) may use one or more HTTP redirections while performing steps to authenticate a user. HTTP redirections are generally supported by the user's web browser on the client device and by the web services on the storage device. However, such HTTP redirections are not supported by the secure shell (SSH) code (process) used for establishing a secure connection to the storage device.

Figure 1:
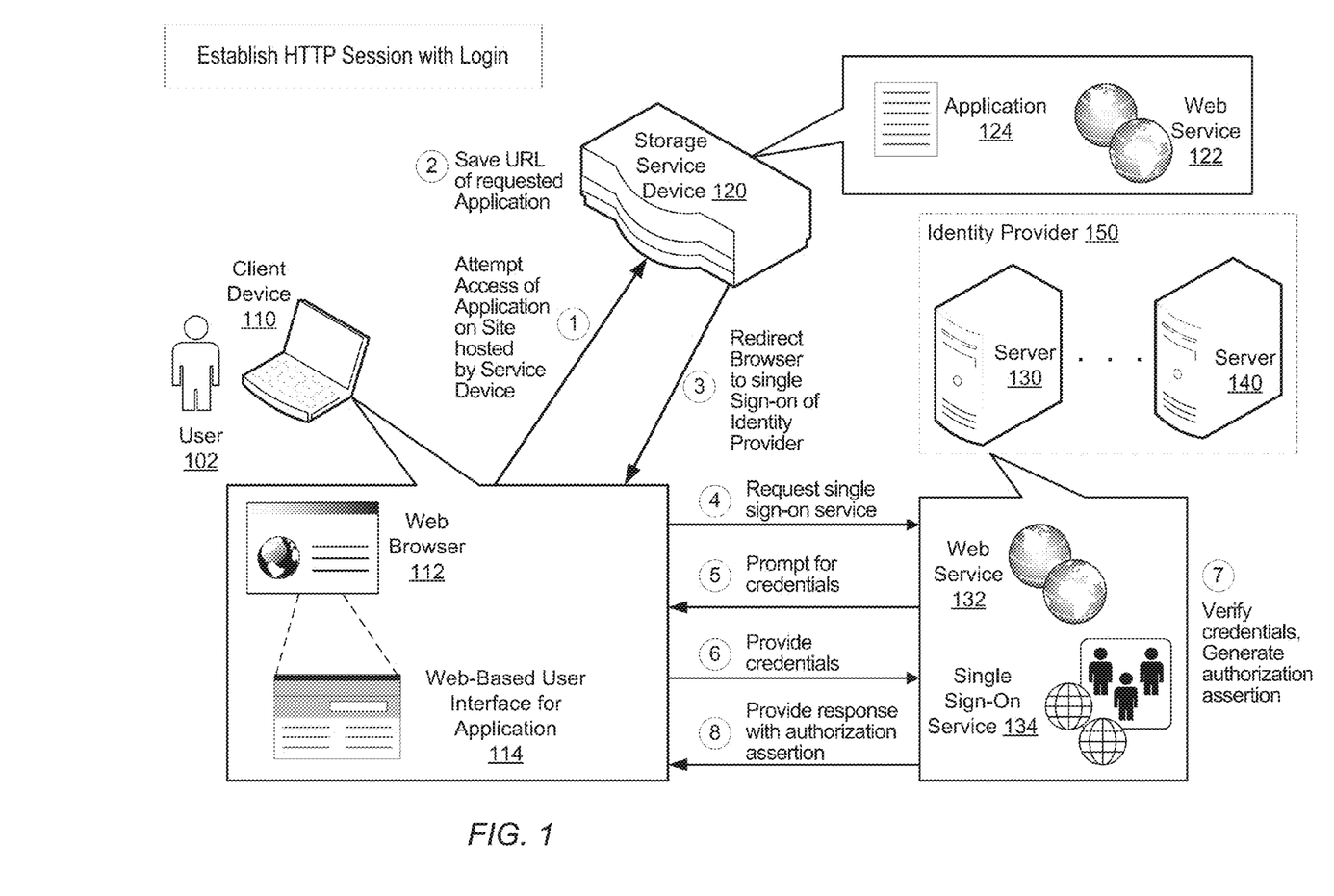
FIG. 1 is a generalized block diagram illustrating one embodiment of establishing a secure HTTP session on a remote storage device hosting Web resources using a third-party single sign-on (SSO) service.
Figure 2:
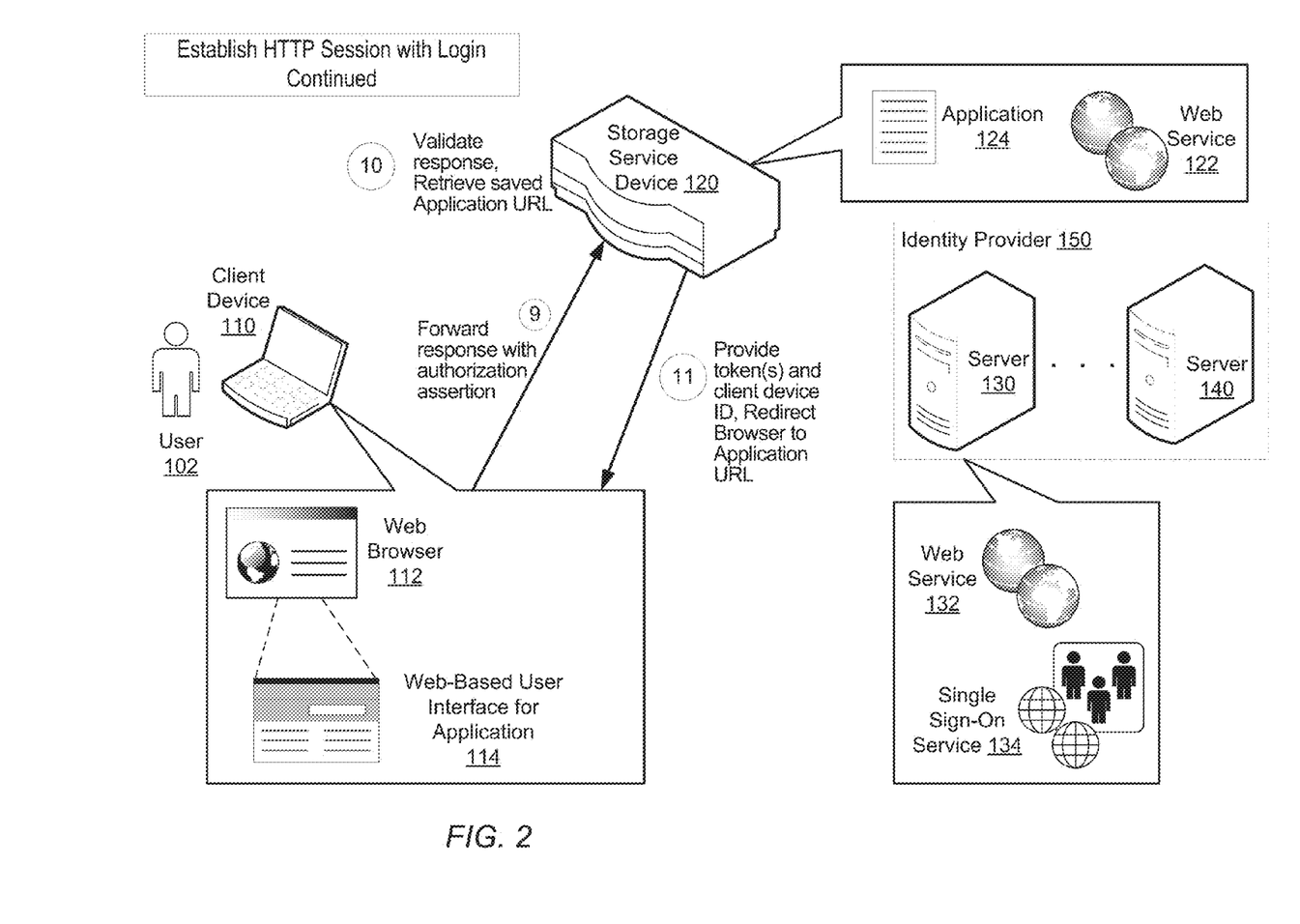
FIG. 2 is a generalized block diagram illustrating one embodiment of continuing to establish a secure HTTP session on the remote storage device hosting Web resources using the third-party SSO service.
Figure 3:
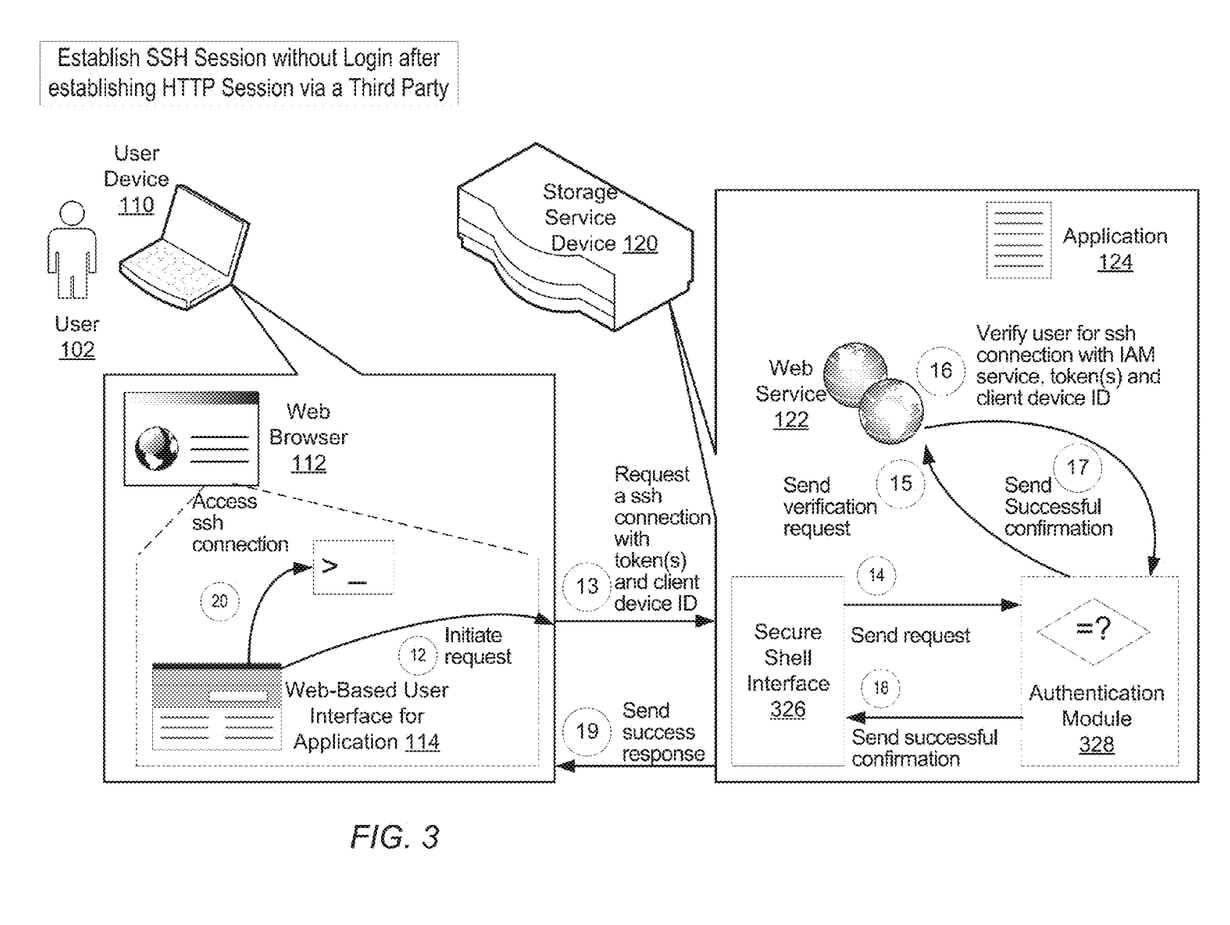
FIG. 3 is a generalized block diagram illustrating one embodiment of establishing a text-based secure shell session on the remote storage device after establishing a secure HTTP session using the third-party SSO service.
Figure 4:
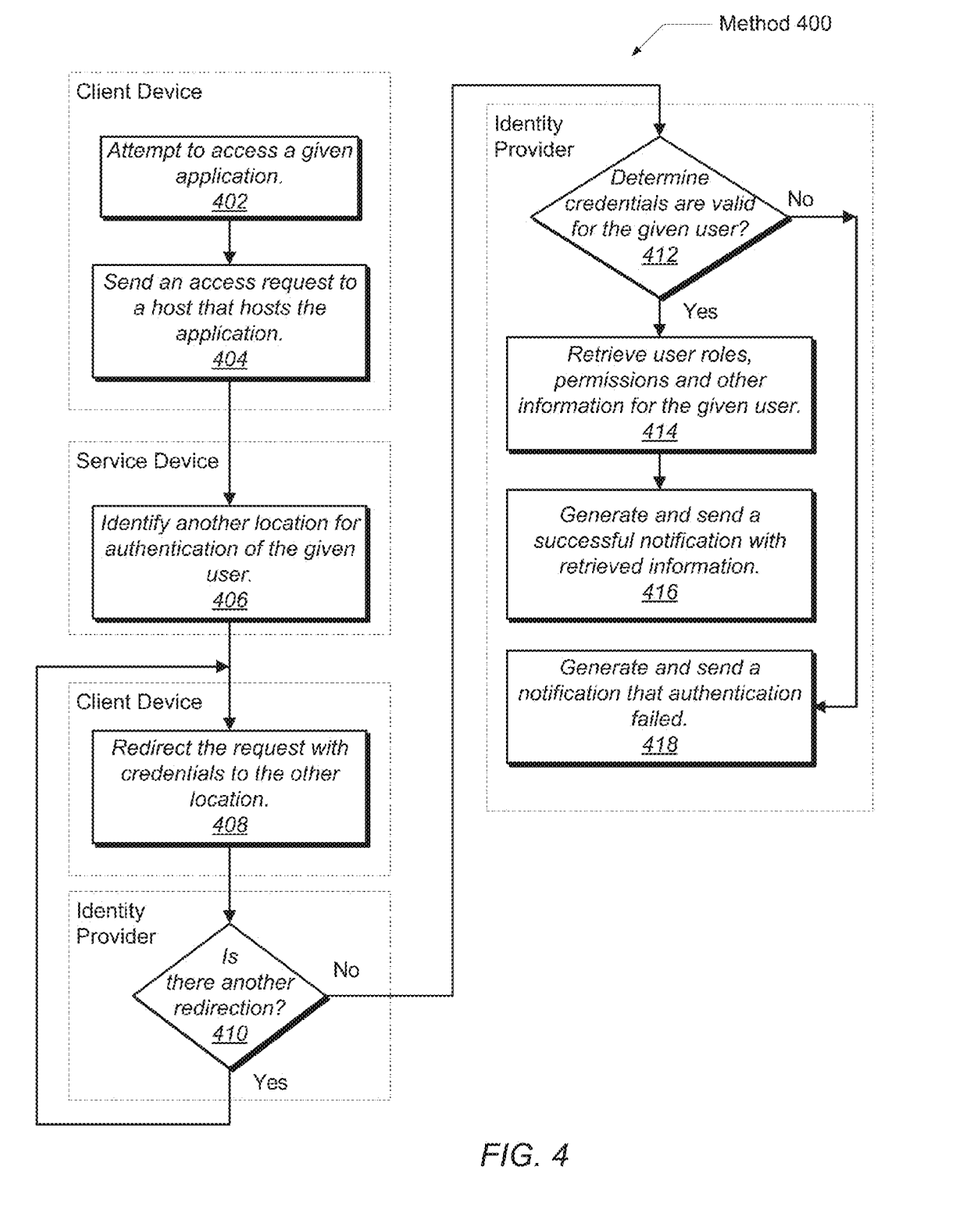
FIG. 4 is a flow diagram illustrating one embodiment of a method for establishing the secure HTTP session on the remote storage device hosting Web resources using the third-party SSO service.
Figure 5:
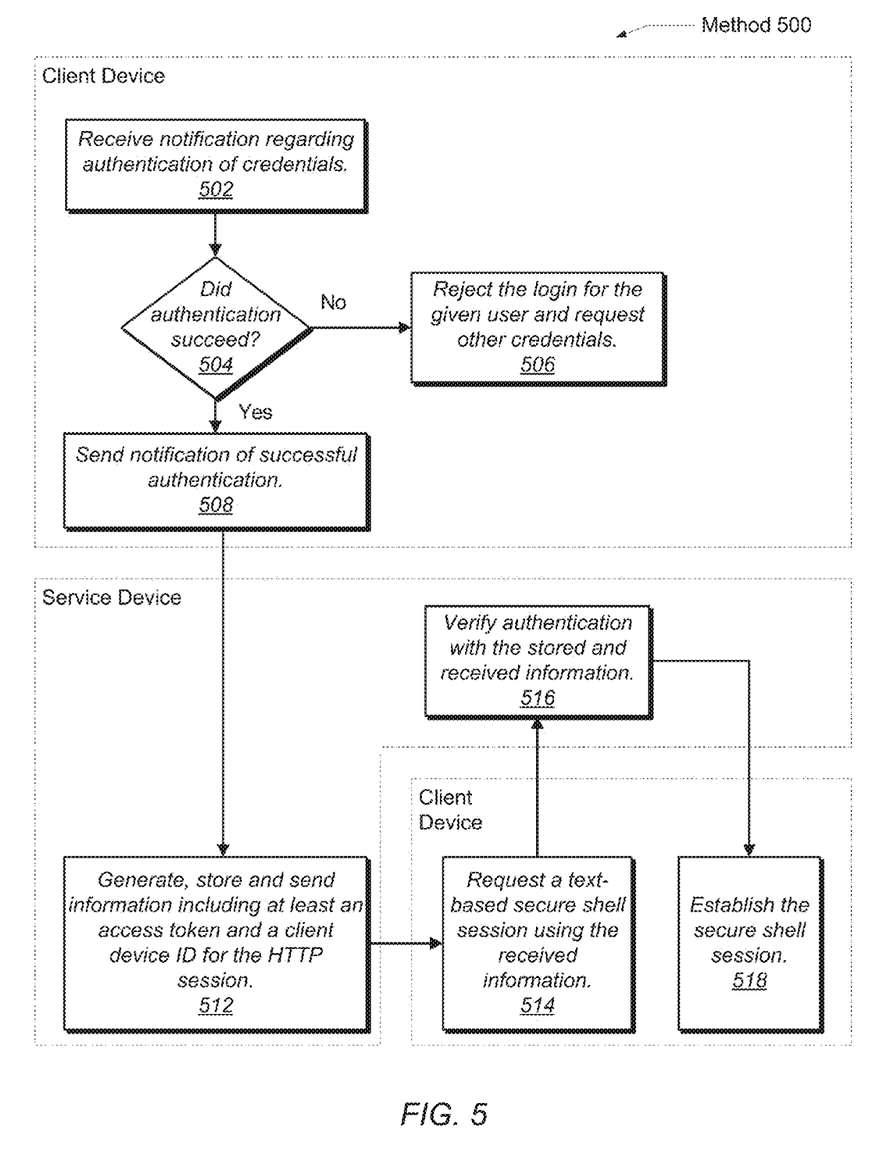
FIG. 5 is a flow diagram illustrating one embodiment of a method for establishing the text-based secure shell session on the remote storage device after establishing the secure HTTP session using the third-party SSO service.

In the following discussion, FIG. 1 and FIG. 2 illustrate an embodiment for establishing a secure HTTP session. Following the establishment of a secure HTTP session, FIG. 3 depicts the establishment of a secure shell session without a user login prompt and without using the third-party identity provider. Finally, each of FIG. 4 and FIG. 5 illustrate a method for establishing a secure HTTP session and a text-based secure shell session on the storage device for the client device.

Referring to FIG. 1, a generalized block diagram of one embodiment of establishing a secure HTTP session on a remote storage device hosting Web resources using a third-party single sign-on (SSO) service is shown. In the embodiment shown, a single client computing device 110 is connected to the storage service device 120. However, in various other embodiments, multiple client computing devices are connected to the storage service device 120 and connected to one or more other devices or servers. The other multiple devices and servers are not shown for ease of illustration. The client computing device 110 may also be referred to as the client device 110. The storage service device 120 may also be referred to as the storage device 120. The client device 110 is also shown connected to a third-party identity provider 150. The identity provider 150 may include one or more serves 130-140 and software for providing one or more of a directory service and an authentication service.

Examples of the client device 110 include at least a desktop computer, a laptop, a tablet computer, a smartphone, and so forth. In some embodiments, the storage device 120 is a type of storage, such as a disk storage, a backup server, a Network-Attached Storage (NAS) device, a Storage Area Network (SAN) device, or other. In other embodiments, the storage device 120 is a purpose-built backup appliance (PBBA). The PBBA may also be referred to as a storage appliance. Typically, storage appliances are a server based on common-used and certified server-hardware sold together with software, wherein the hardware and the software are provided by a single vendor. The storage appliance may include the server, data storage, an operating system, backup software and deduplication software. The all-in-one approach for the storage appliance may lead to relatively quick install (deploy) times. The storage appliance may provide storage, enable storage on another appliance or another storage medium, and/or provide deduplication for both physical systems and virtual systems.

The storage appliances typically provide data storage with capacities between 4 terabytes (TB) and 500 TB. As a result, the storage appliances may replace tape-based backup and recovery processes. In other environments, such as enterprise environments and mainframe environments, the storage appliances may be deployed alongside tape-based systems. The storage appliances may be used for cloud-based storage or on premise storage. The connections between the client device 110 and the storage device 120 may include at least the Internet, wherein each of the client device 110 and the storage device 120 use the Hypertext Transfer Protocol (HTTP) to transfer messages.

In various embodiments, the client device 110 may include one or more processor cores including circuitry for executing instructions according to a predefined general-purpose instruction set architecture (ISA). For example, the SPARC® instruction set architecture (ISA) may be selected. Alternatively, the x86, x86-64®, Alpha®, PowerPC®, MIPS®, PA-RISC®, or any other ISA may be selected. In other embodiments, the client device 110 may include a system-on-a-chip (SOC) with one or more processors utilizing very wide single instruction multiple data (SIMD) architectures to achieve high throughput in highly data parallel applications. For example, the client device 110 may include one or more of a graphics processing unit (GPU), a digital signal processor (DSP), and the like.

The client device 110 may use a Mac OS X operating system, a Microsoft Windows operating system, a Unix-like operating system, a mobile device operating system, or a combination wherein a hard disk is partitioned to host multiple operating systems. As described earlier, examples of the client device 110 include at least a desktop computer, a laptop, a tablet computer, a smartphone, and so forth. The client device 110 may include software such as a Web browser 112. The Web browser 112 may be representative of a number of available World Wide Web browsers such as at least Internet Explorer, Firefox, Google Chrome and Safari.

In various embodiments, the web-based user interface 114 may be a graphical user interface (GUI) within the web browser 112 for the application 124 on the storage device 120. In some embodiments, the web-based application user interface 114 may not be presented to the user 102 on the monitor of the client device 110 until the user 102 is authorized. The web-based application user interface 114 may provide an easy-to-use interface for the user. As is well known to those skilled in the art, the GUI web-based application user interface 114 may lack sufficient support for efficient automated operation sequences, such as sending batch jobs.

The storage device 120 may include multiple software components such as at least an operating system (OS), a Web service 122 and at least one Web-based application 124. The OS (not shown) may be representative of any of a variety of specific operating systems, such as, for example, Symantec Appliance Operating System, Linux, or Sun Solaris. As such, the operating system may be operable to provide a software framework operable to support the execution of various programs such as the Web-based application 124 for deduplication, automatic backup, and recovery operations for system administrators. The Web service 122 may verify authentication and create Web-based sessions and text-based shell sessions for authorized users.

Data management operations, such as operations used in enterprise information management, performed by the storage device 120 provide regulatory compliance. Regulatory compliance ensures the accuracy and completeness of data contained in files and reports as well as consistent data across the enterprise. Both enterprise and small business environments may deploy multiple storage devices to provide the above data management operations. As described earlier, the storage devices are storage appliances. In addition, the environments may deploy multiple client devices to support multiple users who may login locally and/or remotely to one or more storage devices.

Users generally have configuration information including privileges, permissions and roles. In many cases, this user configuration information may be consistent for a given user across several devices. Enterprise environments typically utilize a user directory service to manage the identity of authorized users on devices. As shown, the storage device 120 uses the third-party identity provider 150 for directory service operations and user authentication operations. The third-party identity provider 150 may be used to allow developers to focus on creating Web-based applications hosted on the storage device 120, rather than also support the directory services and the authentication services.

The third-party identity provider 150 also uses a Web service 132 to communicate at least with the client device 110. Each of the client device 110, the storage device 120 and the identity provider 150 utilizes at least the Hypertext Transfer Protocol (HTTP) to communicate. In some embodiments, the third-party identity provider 150 uses a single sign-on (SSO) service 134. In other embodiments, the third-party provider may use a centralized authentication process. In contrast to a centralized authentication process where the user 102 is prompted for credentials for each access of a separate application even when the user has an authorized HTTP session, the user 102 is authenticated only once for the authorized HTTP session with the SSO service 134.

With the SSO service 134, the user 102 provides credentials, such as a username and a password, only once, regardless of the number of separate applications accessed after the initial login for the authorized HTTP session. An access token and an optional refresh token provided by the SSO service 134 authenticates the user 102 for all the applications they have been given rights to and eliminates further prompts for credentials when the user 102 switches applications during a particular authorized HTTP session. Some examples of SSO identity providers include Stormpath, OneLogin, PingOne, Keycloak and Auth0. As will be described later, even when the third-party provider uses the centralized authentication process, the user 102 may be authenticated only once and gain access to multiple applications through the authenticated HTTP session and gain access to an authenticated text-based secure shell session without being prompted for credentials such as a username and a password.

A series of eight steps is shown in FIG. 1 for authenticating the user 102 for a secure HTTP session. The series of steps continue with FIG. 2 where the user 102 establishes the secure HTTP session and accesses the Web-based application 124. The series of steps continue with FIG. 3 where the user 102 is authorized for a secure text-based shell session without being prompted for login credentials. The environment using at least the client device 110, the storage device 120, and the identity provider 150 may utilize Web-based applications and Cloud-based applications to manage data, such as the application 124 on the storage device 120. In some embodiments, the application 124 is a Web-based backup and recovery application. Alternatively, the application 124 is a Web-based application that creates, modifies and removes volumes. In addition, the application 124 may create, mount and share a file system.

Generally speaking, Web resources are software components, artifacts, or data and metadata used by Web-based and Cloud-based applications for creating, modifying, rendering, removing, reading and so forth. The Web resources may include files, documents, storage volumes, and any other target of a Web-based identifier. The Web-based identifier may include a uniform resource locator (URL), a uniform resource identifier (URI), an internationalized resource identifier (IRI), and the like. Web resources are typically collected in a location such as in a subdirectory of a root directory for the Web-based application. In some examples, the subdirectory may be indicated as resources/resource-identifier.

Web resource identifiers are unique strings conforming to a given format such as [locale-prefix/][library-name/][library-version/]resource-name[/resource-version]. Taking the use of URLs as an example, the Web resource URL is an address that the application 124 uses to access the Web resource. In the case that the Web resource is a backup server connected to a backup and recovery application, the corresponding address may use a format such as http://localhost:9399/api/backupServers/79460354-e7c8-6df2-45a7-01df2bcd9b2a. The format includes a base URL and a Web resource location.

Here, the base URL is an entry point to the backup and recovery application's RESTful API, which is further described shortly. The base URL in this example is http://localhost:9399/api/. The string "localhost" is the machine's name where the backup and recovery application is installed. For example, this string may identify the storage device 120 in the example shown in FIG. 1. The string "9399" is a port used to communicate with REST APIs associated with a Web service on server 170 used to access Web resources.

The Web resource location in the above example is /backupServers/79460354-e7c8-6df2-45a7-01df2bcd9b2a. The Web resource location identifies the path to the Web resource itself in the backup and recovery application's RESTful API. The Web resource location is suffixed to the base URL, forming the URL for the Web resource. The Web resource location may include a uniform resource name (URN). Both URL and URN are uniform resource identifiers (URIs). However, the URN is also associated with uniform resource characteristics (URC), which allows a user to add descriptive information associated with the Web resource in the URN such as an author name, a timestamp, a data size, and so forth. Additionally, the URN may include an entity identifier (ID), or key, that uniquely identifies the Web resource. In the above example, the key is 79460354-e7c8-6df2-45a7-01df2bcd9b2a. For the example of a name, accessing a collection of jobs, such as jobs setup for a given batch, may be identified by the URN /jobs7. The complete URL may be http://localhost:9399/api/jobs7.

The key value in the above example may remain valid for identifying an associated Web resource only during the time of the backup and recovery application's RESTful API work session. The application's RESTful API work session, or the work session for the application 124 in the example, may also be referred to as a Hypertext Transfer Protocol (HTTP) session. The HTTP protocol is used for data communication on the World Wide Web, which is also referred to as "Web" or "web". The Web is an information system of interlinked hypertext documents (Web pages) and other digital resources, such as the above Web resources, that are accessed via the Internet.

In various embodiments, the machine-to-machine (client-server) data communication, which is maintained by processes known as Web services, between the client device 110 and the storage device 120 over a network, such as the Internet, may allow manipulation of Web resources using a set of stateless operations. The Web application programming interface (API) used in this data communication may use relatively simple simpler representational state transfer (REST) based communication. An API that uses REST is referred to as a RESTful API. A RESTful API breaks down a transaction to create a series of smaller transactions, each of which performs a particular underlying function of the full transaction. This modularity provides developers with flexibility.

The REST architectural style is used by Web APIs within Web browsers. With an increase in the use of Web-based applications and Cloud-based applications, various APIs, such as RESTful APIs, are emerging to expose Web services. RESTful APIs communicate over the Hypertext Transfer Protocol (HTTP) with HTTP verbs or methods. The HTTP methods (verbs) indicate the action to be performed on an identified Web resource. The Web resource may represent pre-existing data. Alternatively, the Web resource may represent dynamically generated data. The HTTP/1.0 specification defines the HTTP methods (verbs) GET, POST and HEAD. The HTTP/1.1 specification further defines the HTTP methods (verbs) OPTIONS, PUT, DELETE, TRACE and CONNECT.

Returning to the series of steps shown in FIG. 1, the user 102 in step 1 attempts to access a Web resource, such as the application 124, on a particular website hosted by the storage device 120. The access request is a request for a secure HTTP session between the client device 110 and the storage device 120. In step 2, the Web service 122 determines the user 102 is not currently authorized or currently does not a have valid login for a secure HTTP session with the storage device 120. The Web service 122 stores a location identifier, such as an address or a Uniform Resource Locator (URL) on the Internet, for the website of the requested application 124.

In step 3, the Web service 122 sends a response to the Web browser 112 identifying the single sign-on (SSO) service 134 (Web resource) of the third-party identity provider (IDP) 150. The response may be a HTTP redirect response with a header including a destination uniform resource identifier (URI) of the SSO service 134. The response may also include an authentication request encoded as a URL query variable. In step 4, the Web browser 112 sends a request to the SSO service 134 based on the response received from the Web service 122. The SSO Service 134 determines whether the user 102 has an existing valid login HTTP session that meets default or requested authentication policy requirements. The requirements may be placed in the authentication request sent by the Web service 122.

When the SSO service 134 determines the user 102 does not yet have a valid HTTP session, in step 5, the SSO service 134 prompts the user 102 for credentials. In step 6, the Web browser 112 sends a response with the login credentials provided by the user 102. The credentials may include at least a username and a password. The login request from the client device 110 to the identity provider 150 may include an encrypted version of the password provided by the user 102. The client device 110 may use a secure socket layer (SSL) to send the login request to the identity provider 150.

In step 7, the identity provider 150 determines whether the received credentials, such as at least the combination of the username and the password, provided by the user 102 match stored credentials for the user 102. If the credentials match, the identity provider 150 may also retrieve user role information for the user 102, such as a system administrator role or a normal user role and corresponding privileges for the user 102. In addition, the identity provider 150 generates an authorization assertion. The authorization assertion may include one or more tokens, keys or other values indicating successful authorization for the user. The identity provider 150 may generate both an access token and a refresh token. The identity provider 150 may support one or more security token types such as SAML, SPNEGO, and X.509. In addition, the storage device 120 may support these security token types.

In step 8, the identity provider 150 prepares a response indicating successful authorization for the user 102. The SSO service 134 in the identity provider 150 may create a HTML form containing response information such as logon security context for the user 102 with at least the authorization assertion. The identity provider 150 inserts the HTML form in a HTTP response. The HTML form typically includes script code that automatically posts the form to the destination site. The HTTP response is sent to the client device 110.

It is noted that while the above description describes a particular series of steps for purposes of convenience, in various embodiments the order of the steps occurring may differ. Additionally, other steps may be include that are not shown, and in some embodiments some steps may be combined and some may be eliminated. For example, the above description describes a service provider initiated SSO process where the client device 110 initially communicates with the service provider, or the storage device 120 in the example. It is also possible to have an identity provider initiated SSO process where the client device 110 initially communicates with the identity provider 150. All such embodiments are contemplated.

Turning now to FIG. 2, a generalized block diagram of one embodiment of continuing to establish a secure HTTP session on the remote storage device hosting Web resources using the third-party SSO service is shown. Circuits, control logic, communication protocols and software described earlier are numbered identically and shown as in FIG. 1. A series of steps 9-11 are shown. The client device 110 has received the response indicating successful authentication for a secure HTTP session for the user 102. In step 9, the Web browser 112 forwards the information from the identity provider 150 to the Web service 122 on the storage device 120. The Web browser 112 may perform the forwarding due to an auto-submit script. The script instructs an HTTP POST request to send the HTTP form from the identity provider 150 to the Web service 122 on the storage device 120.

In step 10, the storage device 120 receives the HTTP form from the client device 110, accesses the digital signature and analyzes the digital signature. A cryptographic digital signature was inserted in the HTTP form by the identity provider 150. The cryptographic digital signature uses asymmetric encryption keys, such as a public key and a corresponding private key. The private key may also be referred to as a secret key. The private key is used to create a digital signature for the identity provider 150 so the identity provider 150 "signs" the authorization response that it generates. The public encryption key is used for verifying the digital signature created from the private key. The public key and the private key are closely linked with one another so that a different public key cannot be used to authenticate the digital signature created by the private key.

After the storage device 120 validates the digital signature, it compares the information in the assertion contents to corresponding stored values. The assertion contents include one or more user profile attributes such as user roles, email addresses, and other proof of identity attributes. If this access check passes, then the storage device 120 generates a local version of a logon security context for the user 102. In some embodiments, the logon security context includes a local access token and a local refresh token. The access token is used to authenticate the user 102 using the secure HTTP session for each access of a resource such as the application 124 hosted on the storage device 120 during a predetermined time period. The refresh token is used to generate a new access token after expiration of the original access token. Additionally, the storage device 120 may generate a client device identifier (ID) including one or more of a session cookie, another session identifier, an Internet Protocol (IP) address, and a media access control (MAC) address. The storage device 120 may store the client device identifier in order to determine for later requests from the client device 110 whether a received access token and/or an optional refresh token is valid. In some embodiments, the web service 122 generates and/or stores the client device identifier (ID).

In various embodiments, the application 124 performs the above steps on the storage device 120. In other embodiments, another component on the storage device 120 performs the above steps regarding step 10 shown in FIG. 2. The storage device 120 retrieves from stored location information the requested resource URL associated with the application 124. In various embodiments, the web service 122 retrieves the stored location information. In step 11, the storage device 120 sends an HTTP redirect response to the Web browser 112 to access the application 124. In various embodiments, the web service 122 sends the HTTP redirect response. At this point, the user 102 is considered to be "logged on" at the client device 110, has a secure HTTP session on the storage device 120 and is able to access the application 124.

Referring now to FIG. 3, a generalized block diagram of one embodiment of establishing a text-based secure shell session on the remote storage device after establishing a secure HTTP session using the third-party SSO service is shown. Circuits, control logic, communication protocols and software described earlier are numbered identically and shown as in FIG. 1. A series of steps are shown. The user 102 working on the client device 110 has gained access to the application 124 through an authorized and secure HTTP session on the storage device 120. As shown, the storage device 120 includes a secure shell interface 326 and an authentication management module 328.

The secure shell interface 326 is code for providing a process supporting an interface for a secure (encrypted) network protocol. This secure network protocol allows for accessing services of the OS on the storage device 120. The secure shell interface 326 provides a command-line interface (CLI) to the services of the OS, the application 124, and other software applications on the storage device 120. After the user 102 is authorized for the secure HTTP session on the storage device 120, the user 102 may initiate a request for a text-based secure shell session on the storage device 120. In some embodiments, the web-based application user interface 114 may include a button for requesting a text-based secure shell (SSH) session on the storage device 120. Other mechanisms for initiating the request are possible and contemplated. The text-based secure shell session may use an encrypted network protocol to transfer messages between the client device 110 and the storage device 120. Examples of the text-based secure shell session include PuTTY on the Windows operating system and secure shell (SSH) on Unix-like operating systems.

The user 102 may use the text-based SSH session to enter commands on a command line interface (CLI). For example, the user 102 may repetitively execute a number of tasks in a fixed sequence as a batch job on the storage device 120. When the batch job utilizes conditional code, scripting may be used with the languages Java, Perl, Python and so forth. The CLI commands may be entered interactively by the user or passed to the CLI in files. Typically, establishing a text-based SSH session is not done when the third-party identity provider 150 (not shown) is used for user authentication due to the HTTP redirections. Unlike the Web browser 112 on the client device 110 and the Web service 122 on the storage device, the secure shell interface 326 is unable to handle the HTTP redirections performed by the identity provider 150. However, as described shortly, other steps are used to establish the text-based SSH session even when the third-party identity provider 150 is used for user authentication. Authorization for the text-based session request may be achieved without prompting the user for credentials, though, based on the earlier authorization for the HTTP session request.

The authentication management module 328 on the storage device 120 provides a manner for establishing or verifying that a given user is who they claim to be. In some embodiments, the authentication management module is a pluggable authentication management (PAM) module. The authentication management module 328 includes a library that is a generalized API that includes a library of modules for authentication-related services. The authentication management module 328 may be a modified PAM module that includes the capability to communicate with each of the secure shell interface 326 and the Web service 122 to provide authentication for a text-based secure shell session without prompting the user 102 for credentials. The authentication management module 328 allows a system administrator, such as user 102 or a system administrator on storage device 120, to add new authentication methods by installing new libraries. A configuration file, such as a pam.conf file, determines which authentication services to select. Typically, the Web service 122, the secure shell interface 326 and the authentication management module 328 are software on the storage device 120. In alternative embodiments, these components correspond to custom designed circuitry to perform the functions described herein. Alternatively, the components may correspond to a combination of hardware and software. All such embodiments are possible and are contemplated.

Returning to the series of steps, in step 12, the user 102 initiates a request for a text-based secure shell session. The user 102 is not prompted for credentials, such as a username and a password. In some embodiments, the web-based application user interface 114 is a GUI with a button for requesting the text-based secure shell session on the storage device 120. Other mechanisms for initiating the request are possible and contemplated. When the user 102 initiates the request on the client device 110 for the text-based secure shell (SSH) session, the request is for establishing a secure connection to a secure shell (SSH) process on the storage device 120, where the SSH process provides a secure and restricted interface to the application 124 hosted on the storage device 120.

In step 13, the request is sent to the storage device 120. In various embodiments, the request includes a username, the access token and/or the optional refresh token for the secure HTTP session, and the client device ID. Rather than communicate with the third-party identity provider 150, the storage device 120 may compare information in the received request for the text-based SSH session and information stored on the storage device 120.

The information used for the above comparison may include at least the username or other user identifier, the access token and/or the optional refresh token used for the secure HTTP session, and the client device ID used for the secure HTTP session. The comparison used for authentication may be performed within the storage device 120. Alternatively, the storage device 120 may send an indication of the comparison operation and the values to compare to a server, another storage device, or other computing device connected to the storage device 120. However, the third-party identity provider 150 is not used for authentication for the text-based SSH session, and thus, does not perform the comparison. The storage device 120 does not communicate with the third-party identity provider 150 during handling of the request for the text-based SSH session. In some embodiments, the application 124 on the storage device 120 receives the request for the text-based secure shell (SSH) session and in step 14 forwards the request to the authentication module 328. The forwarding may occur through the SSH interface 326.

In the example shown, in step 15 the authentication management module 328 sends a verification request to the Web service 122. The verification request may include at least the username, the access token and/or the optional refresh token used for the secure HTTP session, and the client device ID used for the secure HTTP session, each of which was sent in the request from the client device 110. The verification request does not include a password and the user 102 was not prompted for credentials when initiating the request for the text-based secure shell session or during the steps to establish the text-based secure shell session.

In step 16, the Web service 122 and the authentication module 328 use an identity and access manager (IAM), which is not shown, for authenticating the user 102 for the requested text-based SSH session. Similar to the previous step 10, the storage device 120 performs access checks using multiple pieces of information such as the received username, the client device ID and the access token and/or the optional refresh token. Other information as described earlier may also be used during the access check. The access checks may include at least the earlier comparison operation. No HTTP redirections are used to perform the authorization. The storage device 120 may forgo the HTTP redirections because the request in step 13 for the text-based secure shell session already includes stored information for an authenticated session, such as the earlier established secure HTTP session.

In some embodiments, when the storage device 120 determines successful authorization for the user 102 based on the received information, the storage device 120 generates a corresponding access token and an optional refresh token for the text-based secure shell (SSH) session. In some embodiments, these token values may be different than the access token and the refresh token used for the secure HTTP session. In step 17, the Web service 122 sends the notification of successful authorization and any new access token to the authentication management module 328. Alternatively, the IAM sends notification of the successful authorization to the authentication module 328. In steps 18 and 19, the notification of the successful authorization, any new access token, refresh token and any other new session identifier is sent to the client device 110.

In step 20, the user 102 obtains a text-based secure shell (SSH) session as an authorized user, although the user 102 was not prompted for credentials such as a username and password. The user 102 has access to a CLI and may enter commands and send batch jobs.

The generation and maintenance of token management security strategies is complex. Developers prefer to spend time creating the web-based applications and getting the applications online and running quickly, rather than consuming an appreciable amount of time on writing code for supporting and maintaining the token authentication. Further, for many types of tasks and the corresponding web-based applications, system administrators prefer to use a text-based secure shell (SSH) session. As shown above, the user 102 is able to obtain the text-based secure shell (SSH) session without being prompted for credentials while the storage device 120 uses the third-party identity provider 150.

Turning now to FIG. 4, one embodiment of a method 400 for efficiently establishing the secure HTTP session on the remote storage device hosting Web resources using the third-party SSO service is shown. For purposes of discussion, the steps in this embodiment are shown in sequential order. However, some steps may occur in a different order than shown, some steps may be performed concurrently, some steps may be combined with other steps, and some steps may be absent in another embodiment.

In block 402, a given user working on a client device attempts to access a Web-based application on a remote storage device, which may also be referred to as a service device. In some embodiments, the storage device is a storage appliance. In other embodiments, the storage device is a backup server. A HTTP session (HTTP) session for the storage device is requested for the given user. The given user is prompted for credentials such as at least a username and a password for the given user. In block 404, the request for the HTTP session is sent to the storage device hosting the Web-based application.

In block 406, another location for authentication of the given user is identified. For example, a third-party identity provider may be identified and a corresponding URL may be used to determine its location. In block 408, the request with the credentials is redirected from the storage device to the identity provider. In various embodiments, the redirection is a HTTP redirection.

In some embodiments, there are more than one redirections used before a final identity provider is found to perform authentication for the given user. If there is another redirection (conditional block 410), then control flow of method 400 returns to block 408. Otherwise, if the credentials are determined to be valid for the given user allowing the given user to access the Web-based application through a HTTP session (conditional block 412), then in block 414, the user roles, permissions and other information for the given user are retrieved. The information may be retrieved from a directory service within the identity provider.

In block 416, a successful notification of establishing the HTTP session along with the retrieved information is returned to the client device. Additionally, an authorization assertion may be generated and returned with the notification. The authorization assertion may include one or more tokens, keys or other values indicating successful authorization for the user. If the credentials are determined to be invalid for the given user (conditional block 412), then in block 418, a notification that authentication failed is generated and sent to the client device.

Turning now to FIG. 5, one embodiment of a method 500 for establishing the text-based secure shell session on the remote storage device after establishing the secure HTTP session using the third-party SSO service is shown. For purposes of discussion, the steps in this embodiment are shown in sequential order. However, some steps may occur in a different order than shown, some steps may be performed concurrently, some steps may be combined with other steps, and some steps may be absent in another embodiment.

In block 502, notification regarding authentication of credentials is received at a client device. A given user may have sent credentials for gaining a HTTP session to a service device, such as a storage device which may also be referred to as a storage appliance or a storage backup server. The service device may also be referred to as a service provider. The service device may be a remotely located device in reference to the client device. The service device may host one or more Web-based or Cloud-based applications for use by the given user working on the client device. A third-party identity provider may be used to authorize the given user. The identity provider may have sent the notification regarding the authentication of the given user's credentials.

If the authentication of the given user at the third-party identity provider did not succeed (conditional block 504), then in block 506, the login for the given user is rejected and other credentials may be requested. The rejection and the request for other credentials may be presented on a monitor of the client device. If the authentication of the given user at the third-party identity provider succeeded (conditional block 504), then in block 508, notification of the successful authentication is sent to the service device where a HTTP session is requested. The authorization assertion from the third-party identity provider is also sent.

The service device may host one or more Web-based or Cloud-based applications for use by the given user working on the client device. As described earlier, the notification of the successful authentication at the third-party identity provider may include at least a digital signature from the third-party identity provider and the authorization assertion contents including one or more user profile attributes such as user roles, email addresses, and other proof of identity attributes for the given user and an access token and an optional refresh token or other key values. The service device performs access checks on this information to verify the source of the received contents and to verify the given user requesting access to one or more Web-based or Cloud-based applications hosted on the service device.

Upon successfully completing the access checks, in block 512, the service device generates one or more of a local version of a logon security context for the given user, a local access token and a session identifier for the given user. Additionally, the service device may generate a client device identifier (ID) including one or more of a session cookie, the session identifier, an Internet Protocol (IP) address, and a media access control (MAC) address. The service device may store the access token and/or the refresh token as well as the client device identifier. The stored information may be used to validate subsequent access requests from the client device for web resources hosted on the service device. In addition, the stored information may be used for a subsequent request to establish a text-based secure shell session. The service device sends the information to the client device. At this point, the given user is considered to be "logged on" to the remote service device at the local client device. The user has an established secure HTTP session on the remote service device and is able to access one or more Web-based and Cloud-based applications hosted on the service device where the given user has authorized permission.

In block 514, a text-based secure shell session is requested using the access token from the service device and the client device ID. In some embodiments, the given user selects a button on a web-based application user interface to initiate the request for the text-based secure shell session. Other mechanisms for initiating the request are possible and contemplated. When the given user initiates the request on the client device for the text-based secure shell (SSH) session, the request is for establishing a secure connection to a secure shell (SSH) process on the service device, wherein the SSH process provides a secure and restricted interface to the web-based application hosted on the service device. The given user may not be prompted for credentials, such as a username and password, during the request. Examples of the text-based secure shell session include PuTTY on the Windows operating system and SSH on Unix-like operating systems.

Unlike the Web browsers and Web services operating on the client device and the service device, a text-based secure shell interface is unable to handle the HTTP redirections performed by the third-party identity provider. Therefore, in block 516, when the service device receives the request to establish the text-based secure shell session, rather than send a request to the identity provider, the service device handles the authorization of the given user based on the earlier authorization performed for establishing the HTTP session for the given user. For example, in various embodiments, a pluggable authentication module (PAM) and a Web service on the service device handle the authorization of the given user for establishing the text-based secure shell session. An identity and access manager (IAM) may also be used.

Similar to the previous verification for the HTTP session, the Web service or other control logic (or circuitry) performs access checks in response to receiving the request for establishing the text-based secure shell session. The access checks use multiple pieces of information corresponding to the given user and the authorized HTTP session. The pieces of information may include at least the username for the given user, the access token and the optional refresh token used for the secure HTTP session and the client device ID used for the secure HTTP session. Other information as described earlier may also be used during the access check. No HTTP redirections are used to perform the authorization for the text-based secure shell session.

In some embodiments, when the service device determines successful authorization for the given user based on the above pieces of information, the service device generates a corresponding access token for the text-based secure shell session. In various embodiments, the service device uses the received access token and/or the refresh token to generate the access token for text-based secure shell session. In other embodiments, the access token or another session identifier for the text-based secure shell session may be generated in many other possible ways. The service device sends a notification of successful authorization and any new access token or session identifier to the client device. At this point, the given user is considered to be "logged on" at the client device and has a text-based secure shell session on the service device.

In block 518, the given user is able to access one or more authorized Web-based and Cloud-based applications hosted on the service device through the command line interface (CLI) of the text-based secure shell session. These accesses use the previously generated access token for the text-based secure shell session. The given user may then open the text-based secure shell session within a window separate from the GUI-based application interface (e.g., within the browser in one embodiment) as an authorized user, although the given user was not prompted for credentials. The given user may enter commands or perform efficient automated operation sequences, such as sending batch jobs.

In various embodiments, one or more portions of the methods and mechanisms described herein may form part of a cloud computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:
1. An authentication system comprising:
a third-party identity provider (IDP) configured to authenticate a plurality of users through a series of one or more Hypertext Transfer Protocol (HTTP) redirections;
a storage device hosting an application; and
a client device configured to:
send a first request to establish a secure HTTP session with the storage device in order to access the application; and
send a second request different from the first request to establish a secure shell (SSH) session, wherein the second request comprises at least an access token generated during establishing of the secure HTTP session using the third-party IDP, wherein the access token is to be used for both verifying subsequent accesses of the application from the client device via the secure HTTP session and establishing the SSH session; and
wherein in response to receiving the second request, the storage device is configured to authorize the client device to establish the SSH session although the second request lacks a password, in further response to veri- fying the access token corresponds to the previously established secure HTTP session.

2. The authentication system as recited in claim 1, wherein the storage device is further configured to send at least the access token and a client device identifier (ID) to the client device responsive to receiving from the third-party IDP an indication of successful authentication for a given user of the plurality of users on the client device requesting to access the application through a secure HTTP session.

3. The authentication system as recited in claim 2, wherein the storage device is further configured to store each of the access token and the client device ID to use for verifying subsequent accesses of the application from the client device via the secure HTTP session.

4. The authentication system as recited in claim 3, wherein the client device ID comprises one or more of a session cookie, an Internet Protocol (IP) address, and a media access control (MAC) address.

5. The authentication system as recited in claim 2, wherein the second request from the client device to establish the SSH session further comprises the client device ID.

6. The authentication system as recited in claim 3, wherein to authorize the client device to establish the SSH session, the storage device is further configured to determine whether at least the access token and the client device ID in the request matches the stored access token and the stored client device ID.

7. The authentication system as recited in claim 3, wherein to authorize the client device to establish the SSH session, the storage device is further configured to forego any HTTP redirections.

8. The authentication system as recited in claim 3, wherein to authorize the client device to establish the SSH session, the storage device is further configured to forego using the third-party IDP.

9. A method for executing on a processor, the method comprising:
authenticating with a third-party identity provider (IDP) a plurality of users through a series of one or more Hypertext Transfer Protocol (HTTP) redirections;
hosting an application on a storage device;
sending a first request from a client device to establish a secure HTTP session with the storage device in order to access the application;
sending a second request different from the first request from the client device to the storage device to establish a secure shell (SSH) session, wherein the second request comprises at least an access token generated during establishing of the secure HTTP session using the third-party IDP, wherein the access token is to be used for both verifying subsequent accesses of the application from the client device via the secure HTTP session and establishing the SSH session; and
authorizing the client device to establish the SSH session although the second request lacks a password, in response to verifying the access token corresponds to the previously established secure HTTP session.

10. The method as recited in claim 9, further comprising sending at least the access token and a client device identifier (ID) to the client device responsive to receiving from the third-party IDP an indication of successful authentication for a given user of the plurality of users on the client device requesting to access the application through a secure HTTP session.

11. The method as recited in claim 10, further comprising storing each of the access token and the client device ID in the storage device to use for verifying subsequent accesses of the application from the client device via the secure HTTP session.

12. The method as recited in claim 11, wherein the client device ID comprises one or more of a session cookie, an Internet Protocol (IP) address, and a media access control (MAC) address.

13. The method as recited in claim 10, wherein the second request from the client device to establish the SSH session further comprises the client device ID.

14. The method as recited in claim 11, wherein to authorize the client device to establish the SSH session, the method further comprises determining whether at least the access token and the client device ID in the request matches the stored access token and the stored client device ID.

15. The method as recited in claim 11, wherein to authorize the client device to establish the SSH session, the method further comprises foregoing any HTTP redirections.

16. The method as recited in claim 11, wherein to authorize the client device to establish the SSH session, the method further comprises foregoing using the third-party IDP.

17. A storage device comprising:
a processor; and
a memory configured to:
store an application; and
store program instructions executable by the processor to:
send requests to a third-party identity provider (IDP) configured to authenticate a plurality of users through a series of one or more Hypertext Transfer Protocol (HTTP) redirections;
receive a given request from a client device to establish a secure shell (SSH) session, wherein the given request comprises at least an access token generated during establishing of a secure HTTP session for the client device using the third-party IDP, wherein the access token is to be used for both verifying subsequent accesses of the application from the client device via the secure HTTP session and establishing the SSH session; and
authorize the client device to establish the SSH session although the given request lacks a password, in further response to verifying the access token corresponds to the previously established secure HTTP session.

18. The storage device as recited in claim 17, wherein the program instructions are further executable by the processor to send at least the access token and a client device identifier (ID) to the client device responsive to receiving from the third-party IDP an indication of successful authentication for a given user of the plurality of users on the client device requesting to access the application through a secure HTTP session.

19. The storage device as recited in claim 18, wherein the given request from the client device to establish the SSH session further comprises the client device ID.

20. The storage device as recited in claim 18, wherein to authorize the client device to establish the SSH session, the program instructions are further executable to determine whether at least the first access token and the client device ID in the request matches stored values of the first access token and the stored client device ID.

* * * * *

UNITED STATES PATENT AND TRADEMARK OFFICE
CERTIFICATE OF CORRECTION

| | | |
|---|---|---|
| PATENT NO. | : 9,923,888 B2 | Page 1 of 1 |
| APPLICATION NO. | : 14/874173 | |
| DATED | : March 20, 2018 | |
| INVENTOR(S) | : Goel et al. | |

It is certified that error appears in the above-identified patent and that said Letters Patent is hereby corrected as shown below:

In the Claims

Column 18, Claim 20, Line 63, please delete "first access" and substitute -- access --.

Column 18, Claim 20, Line 64, please delete "first access" and substitute -- access --.

Signed and Sealed this
Twenty-fourth Day of July, 2018

Andrei Iancu
*Director of the United States Patent and Trademark Office*